United States Patent [19]

Sperry et al.

[11] Patent Number: 5,699,902
[45] Date of Patent: Dec. 23, 1997

[54] FOAM IN BAG PACKAGING SYSTEM

[76] Inventors: Laurence Burst Sperry, 121 Brayton Rd., Boston, Mass. 02135; Anthony Orkin Davlin, 70 Mt. Vernon St., Boston, Mass. 02108

[21] Appl. No.: 626,981

[22] Filed: Apr. 3, 1996

[51] Int. Cl.⁶ .................................................. B65D 81/03
[52] U.S. Cl. ............................................ 206/219; 206/524
[58] Field of Search ....................... 206/219, 524, 206/523, 814

[56] References Cited

U.S. PATENT DOCUMENTS

| | | |
|---|---|---|
| 2,895,603 | 7/1959 | Freeman . |
| 3,190,442 | 6/1965 | Gauss . |
| 3,222,843 | 12/1965 | Schneider . |
| 3,229,936 | 1/1966 | Quillinan . |
| 3,307,318 | 3/1967 | Bauman . |
| 3,332,670 | 7/1967 | Swartz . |
| 3,419,134 | 12/1968 | Fitts . |
| 3,503,177 | 3/1970 | Kropscott et al. . |
| 3,543,966 | 12/1970 | Ryan et al. . |
| 3,722,833 | 3/1973 | Inoue et al. . |
| 3,860,219 | 1/1975 | Nickerson, Jr. . |
| 3,892,060 | 7/1975 | Stanley, Jr. . |
| 4,002,289 | 1/1977 | Moore . |
| 4,049,242 | 9/1977 | Porter . |
| 4,057,047 | 11/1977 | Gossett . |
| 4,145,449 | 3/1979 | Nelham . |
| 4,193,499 | 3/1980 | Lookholder . |
| 4,221,290 | 9/1980 | Bast . |
| 4,226,330 | 10/1980 | Butler . |
| 4,232,788 | 11/1980 | Roth . |
| 4,239,105 | 12/1980 | Gilbert . |
| 4,240,556 | 12/1980 | Field . |
| 4,256,256 | 3/1981 | Meyers . |
| 4,272,898 | 6/1981 | Tansill . |
| 4,273,689 | 6/1981 | Smearing . |
| 4,450,089 | 5/1984 | Maloney . |
| 4,620,633 | 11/1986 | Lookholder . |
| 4,631,905 | 12/1986 | Maloney . |
| 4,795,265 | 1/1989 | Dahlberg et al. . |
| 4,803,086 | 2/1989 | Hedenberg . |
| 4,845,923 | 7/1989 | Donovan . |
| 5,009,311 | 4/1991 | Scheak . |
| 5,098,228 | 3/1992 | Mauthe . |
| 5,287,961 | 2/1994 | Herran ............................. 206/219 |
| 5,476,175 | 12/1995 | Jaszai ............................. 206/219 |

FOREIGN PATENT DOCUMENTS 19545120  12/1995  Germany .

*Primary Examiner*—Jacob K. Ackun
*Attorney, Agent, or Firm*—The Bell Seltzer Intellectual Property Group of Alston & Bird LLP

[57] ABSTRACT

A foam-in-place packaging system is disclosed that comprises a bag foamed of two sheets of flexible plastic film material sealed on all four sides by respective edge seals. A plurality of frangible seals are between the two sheets and define three separate interior cells in the bag. The frangible seals extend between the edge seals or between an edge seal and another frangible seal to thereby define a single cell bag when the frangible seals are broken. The cells separately contain a first and second foam precursor composition, and the bag includes means for permitting gases to vent from the bag as the foam precursors form foam while preventing foam or foam precursors from escaping from the bag. As a result, when the frangible seals are entirely broken, the separate cells foam a single interior cell in which the first and second foam precursors can mix thoroughly and react entirely to eliminate precursor residue and permit the resulting foam to expand properly and flow freely within the resulting single interior cell of the bag.

52 Claims, 4 Drawing Sheets

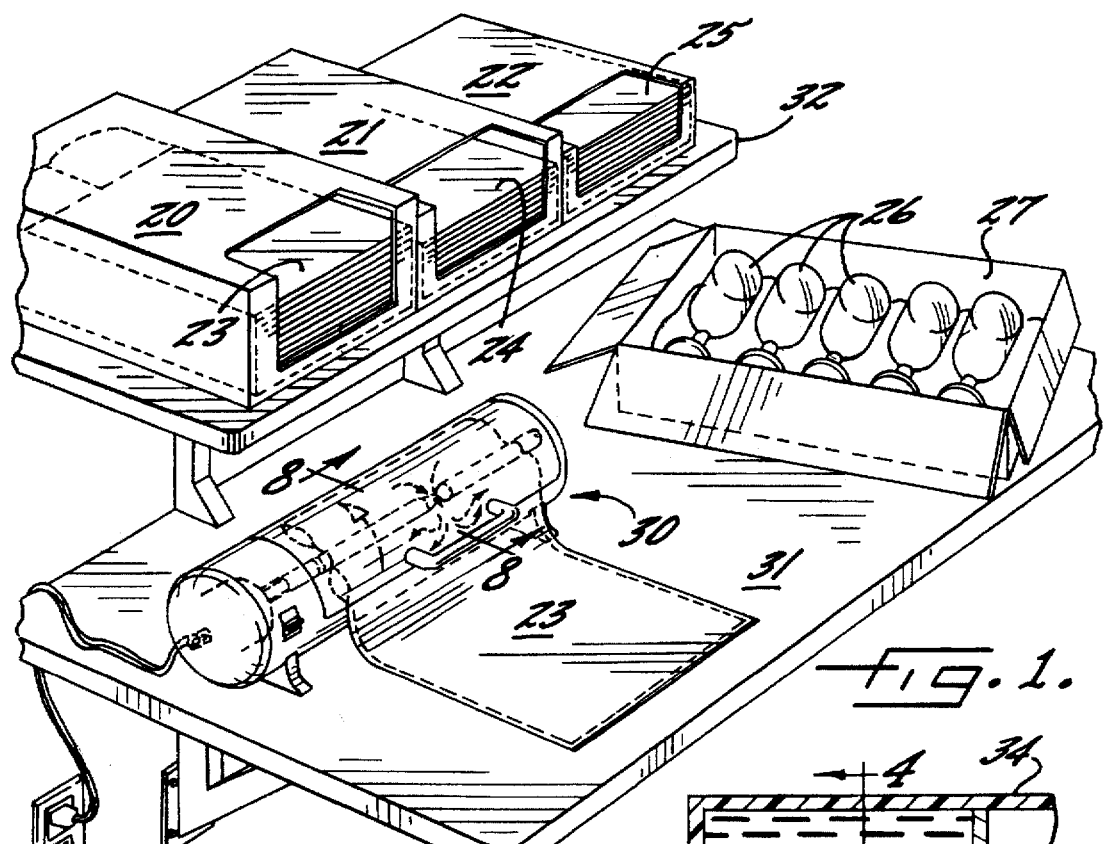
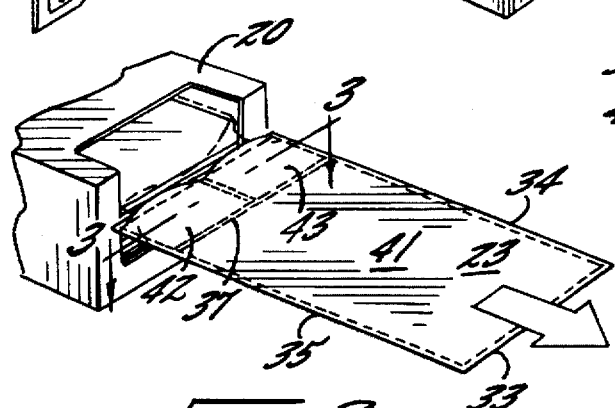
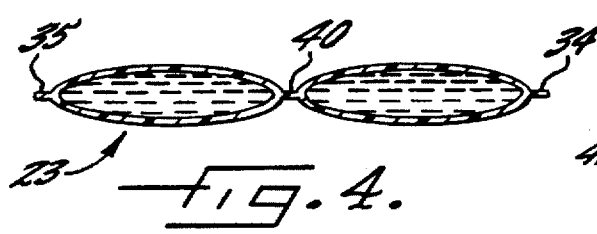
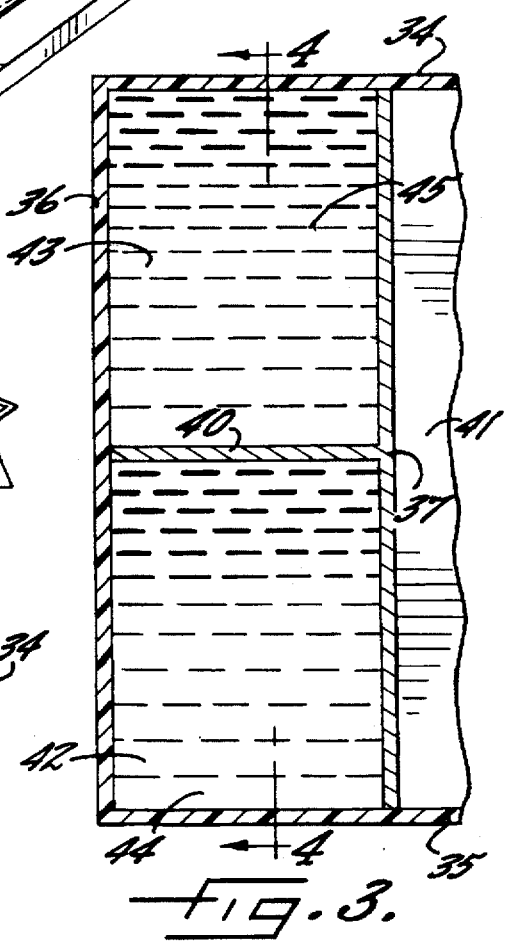

FOAM IN BAG PACKAGING SYSTEM

FIELD OF THE INVENTION

The present invention relates to foam-in-place packaging systems and in particular relates to the manufacture, structure, and use of bag cushion precursors that carry foamable compositions.

BACKGROUND OF THE INVENTION

The present invention relates generally to foam-in-place packaging. Foam-in-place packaging has been well known and widely used as a protective packaging method for a number of years. The underlying technology is based upon the reaction between two (usually liquid) chemicals that form a solid polymer while at the same time generating a gaseous by-product. In particular, when isocyanate compounds react with polyols, the reaction produces both a urethane polymer ("polyurethane") and carbon dioxide. Under proper conditions, the carbon dioxide generated by the reaction will bubble and disperse through the polymer as it hardens to thus form an expanded polymer foam that can be used as a protective material for packaging fragile objects. The process by which the liquid precursors mix as liquids and then expand as not-yet-hardened foam takes a minute or two, thus making feasible its manipulation and use for packaging purposes.

In a first generation of foam-in-place packaging, objects to be protected were placed into containers (e.g. corrugated boxes), and wrapped or draped with a protective material such as a plastic sheet. Thereafter, the polyol and isocyanate were pumped from separate supplies, mixed, and then injected from a gun-like dispenser into the container. If the amount of injected mixture was appropriate, the resulting foam would essentially fill the interior of the container while surrounding the object to provide a custom package. Such relatively straight forward injection practices are still useful in many applications, and an updated injection device is disclosed, for example, in copending and commonly assigned application Ser. No. 08/361,322 filed Dec. 21, 1994 for "Hand Held Dispenser for Foamable Compositions and Dispensing System."

In a next generation of foam-in-place packaging, devices have been developed which concurrently produce plastic bags and fill them with the foamable mixture of polymer precursors. The bag a vent to permit the carbon dioxide to escape. A packaging operator can simply drop one or more newly made bags into a container carrying an object to be packaged, and then close the container. The foam in the bags continues to generate and expand until it likewise fills the interior of the container while forming a custom-shaped cushion around the object packaged therein. Such bag making systems provide the advantage of injecting the foam into a bag that is immediately closed, rather than requiring the operator to manually dispense the foam. As is known to those familiar with such foamable chemicals, they tend to be extremely messy and, if not controlled properly, can cause problems which slow or stop the entire packaging process until the unwanted foam residue can be cleaned up. In more serious circumstances, the foam can even cause its handling machinery to break down leading to further additional delays.

Examples of foam-in-place devices are described in a number of patents and copending applications that are commonly assigned with the present invention. These include inter alia, U.S. Pat. Nos. 4,800,708; 4,854,109; 4,938,007; 5,027,583; 5,139,151 and 5,376,219 and pending applications Ser. Nos. 08/121,751, filed Sep. 15, 1993 and 08/514,010 filed Aug. 11, 1995.

The packaging requirements of various users can, however, differ widely. Thus, any particular given foam-in-place system may not be appropriate or economically viable for every potential user. For example, users who repetitively use foam cushions on a large volume basis are probably most appropriately served by one of the more sophisticated devices such as those described in U.S. Pat. Nos. 5,376,219 or 4,800,708. For less frequent users, the smaller and more compact devices such as that illustrated in pending applications Ser. Nos. 08/121,751 and 08/514,010 may be appropriate, and as mentioned above, some users still prefer the simplest technique of using an injection system with a gun type device that dispenses the foam.

At present, however, the market lacks any foam-in-place packaging system for the less frequent user who would otherwise like to take advantage of foam-in-place packaging, but has neither the desire nor the facilities to incorporate any one of the previous mentioned foam-in-bag systems. Accordingly, it has been considered desirable to manufacture a bag in which the foam precursors are separately maintained during storage so that in use, the packaging operator can simply take one of the bags, mix the ingredients by hand (i.e. handle the bag's exterior while mixing the precursors inside), and then place the expanding bag and foam into a package for purposes identical to those just described.

To date, however, attempts at doing so have been generally unsuccessful for reasons that are best illustrated by U.S. Pat. Nos. 3,419,134 to Fitts, and 4,232,788 to Roth.

Fitts '134 discloses several variations of a foamable package and a method for forming cellular foam in which the foam precursors are placed in two separate smaller bags inside a larger bag. According to Fitts, there are rupturable borders between the bags, so that when the operator physically breaks the borders, the chemicals will mix and form foam. The Roth '788 disclosure is essentially the same from a conceptual standpoint. Each of these suffer from some significant disadvantages, however, and essentially neither has appeared on the marketplace in any significant presence.

There are several reasons for this failure. First, in order to produce foam, the two foam precursors must mix successfully and completely. Indeed, the successful total mixture of the foamable precursors is a fundamental requirement for all foam-in-place systems. Stated differently, if the foam precursors fail to mix successfully, either foam will not be produced, or the foam that is produced will be structurally inappropriate.

Thus, the Fitts disclosure demonstrates that in the bag-in-bag structure, some residue of at least one, and sometimes both, of the precursors will always tend to remain behind and unreactive on the inner walls of the separate bags. In turn, the presence of this residue raises several problems. First, the foam precursors (particularly the isocyanates) are environmentally undesirable and subject to regulation as such. In fact, they are much more undesirable than is the polyurethane foam, which is much more environmentally friendly. Thus, use of a Fitts-type bag will always result in a packaging cushion that contains some residual isocyanate providing a hazard for the operator, those transporting the package, and eventually the end user. Additionally, the isocyanate residue will tend to chemically damage anything being packaged that was chemically sensitive.

Secondly, because the Fitts and Roth-type devices often fail to permit all of the precursors to react with one another, the yield of foam is typically reduced, thus reducing their packaging effectiveness and cost efficiency.

Third, in some of the Fitts and Roth-type devices, foam is essentially forced to break out of the second bag. As known to those familiar with foamable compositions, foam is best produced when it is allowed to freely expand and form within the packaging container. Foam that can't freely expand—and foam in a Fitts or Roth-type device will not freely expand—will lose yield and efficiency (i.e. less cubic feet of foam per pound of chemicals), will have a deficient cell structure (causing the foam to perform less properly than it otherwise could or for which it was designed), and will tend to shrink causing similar problems. Forcing the foam to rupture the bag-in-bag will also throw off the timing of the mixing and expansion of the foam. In this regard, and is well known by those of ordinary skill in this art, the timing with which the foam expands is also important to the final structure—and thus performance—of the foam.

Accordingly, the Fitts and Roth devices will either have unreacted residue, or will restrict the free expansion of the foam, or both.

As yet another disadvantage, the chemicals used to make foam are generally very sensitive to atmospheric conditions, and if exposed to atmospheric conditions, or otherwise allowed to leak or permeate from a stored plastic bag, their effectiveness will be reduced or destroyed.

As a final disadvantage, the Fitts disclosure dates from approximately 1965, and those of ordinary skill in the art of plastics making and sealing will recognize that seals that are rupturable upon demand within such bags were generally not then available on any commercial basis, or indeed any basis at all, at the time of the Fitts disclosure.

Therefore, there remains the need for a foam-in-place bag system which the end user can keep in shelf storage for an appropriate period of time and which, when it is to be used, can be easily and completely internally ruptured to give a complete mixing of the foam precursors that eliminates precursor residue and allows proper and free expansion of the foam in order to form a structurally appropriate packaging cushion.

OBJECT AND SUMMARY OF THE INVENTION

Therefore, it is an object of the present invention to provide a foam-in-bag system which provides shelf storage for the end user and from which a foam cushion can be manufactured by external manipulation of the shelf storable bag and which still provides for proper and free expansion of foam in order to form a structurally appropriate foam cushion, and without foam precursor residues.

The invention meets this object with a foam-in-place packaging system which comprises a bag formed of two sheets of flexible plastic film material closed on all four edges. A frangible seal between the two sheets defines separate interior cells in the bag. The frangible seals extend between the edges or between an edge and another frangible seal to thereby define a single cell bag when the frangible seals are broken. The cells separately contain a first and second foam precursor composition, and the bag includes means for permitting gases to vent from the bag as the foam precursors form foam while preventing foam or foam precursors from escaping from the bag. As a result, when the frangible seals are entirely broken, the separate cells form a single interior cell in which the first and second foam precursors can mix thoroughly and react entirely to eliminate precursor residue and permit the resulting foam to expand properly and flow freely within the resulting single interior cell of the bag.

In another aspect, the invention comprises a mixing device that complements the bag containing the foam precursors, and that forms a foam cushion from the bag and the foam precursors.

In yet a third aspect, the invention comprises the method of packaging objects using the bag containing the foam precursors.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is a perspective view of a packaging station that incorporates the present invention;

FIG. 2 is a perspective view of one of the bags according to the present invention;

FIG. 3 is a cross-sectional view taken along lines 3—3 of FIG. 2;

FIG. 4 is a cross-sectional view taken along lines 4—4 of FIG. 3.

DETAILED DESCRIPTION

Figure 5:
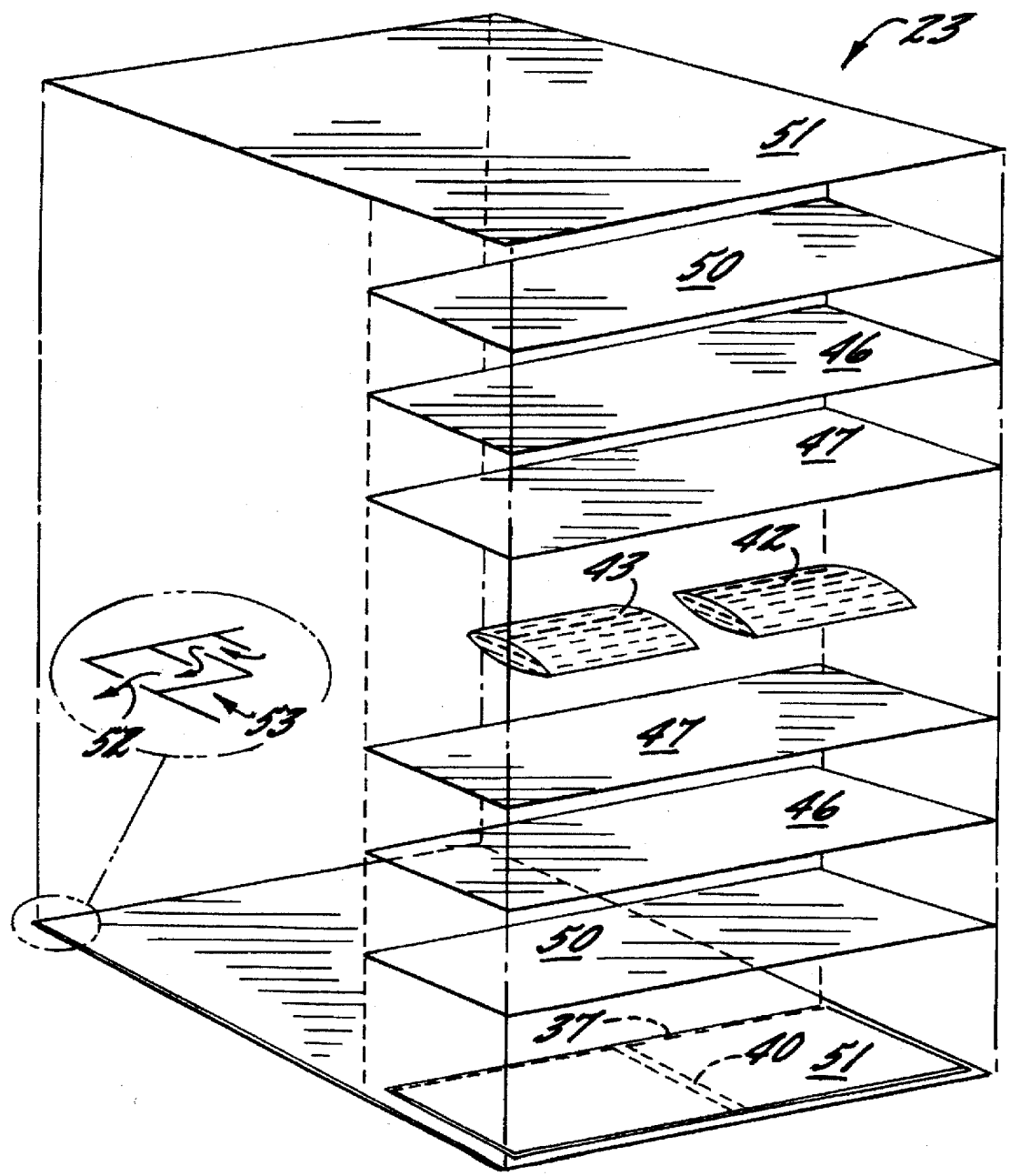
FIG. 5 is a perspective exploded view of one of the bags according to the present invention.

FIG. 1 illustrates a packaging station that takes advantage of the features of the present invention. FIG. 1 illustrates three supply boxes 20, 21, and 22 that respectively contain three sizes of bags 23, 24, and 25 respectively, according to the present invention. As FIG. 1 illustrates, the invention is particularly useful when fragile objects such as the beverage glasses 26 are packaged in a container such as the corrugated box 27.

The precursor mixing means 30 is relatively compact and can be used on a table top 31 or similar surface within easy reach of the boxes 20, 21 and 22 on the nearby shelf 32. As will be described herein in more detail, when the mixing means 30 mixes the foam precursors, the foam precursors in the bag 23 will react to form foam at which time the bag 23 can be dropped into the corrugated container 27, after which the corrugated container can be closed so that the bag 23 will expand with its foam therein to form a custom package around the glasses 26.

The bags (hereinafter referred to for simplicity and consistency as 23) are formed of two coincident sheets of a flexible plastic film material, potentially including composite film materials, closed on all four sides by (in the illustrated embodiment) respective and substantially hermetic edge seals 33–36. It will be understood that the closed sides could also be formed by folding the plastic sheet (e.g. three sealed edges and one folded edge), or by using tube stock (e.g. two folded edges and two sealed ends) or by any other similar arrangement.

A plurality of frangible seals 37 and 40 between the two sheets define three (or more) separate interior cells 41, 42, and 43 in the bag 23. The frangible seals 37 and 40 extend between the edge seals (e.g. frangible seal 37) or between one edge seal and another frangible seal (e.g. frangible seal 40) or potentially entirely between frangible seals (not shown) to thereby define a single cell bag when the frangible seals are broken. One of the interior cells 42 contains a first foam precursor composition 44 and another of the interior cells 43, usually an adjacent cell, carries a second foam precursor composition 45. Either or both of the cells 42 and 43 can also carry a gas that is chemically inert to the precursor composition to thereby provide additional interior volume. The increased volume provides a greater angle of attack on the frangible seals, and thus decreases the force required to break those seals 37, 40 when exterior pressure is applied to the bag 23 in a manner discussed further hereinafter.

The bag further comprises means (FIG. 5) for permitting gases to vent from the bag as the foam precursors form foam while still preventing foam or foam precursors from escaping.

As a result, when the frangible seals 37 and 40 are entirely broken, the separate cells 41, 42, and 43 thereby form a single interior cell in which the first and second foam precursors 44 and 45 can mix thoroughly and react entirely to eliminate precursor residue and permit the resulting foam to expand properly and flow freely within the resulting single interior cell of the bag 23.

Although the present illustrations show the precursor cells 42 and 43 at one end of the bag 23, it will be understood that the position of the cells and the frangible seals is not limited to the illustrated orientation, and the seals can be positioned elsewhere, provided that the seals are entirely frangible and that a single cell bag results in which the foam can react completely and expand freely.

FIG. 5 illustrates a number of additional features of the bag. First, in order to prevent the foam precursors from reacting with each other sooner than desired, or from escaping from the bag during shelf storage, or from reacting with the ambient surroundings, the portions of the plastic sheets that form the cells 42 and 43 with the first and second foam precursors 44 and 45 therein are substantially impermeable to water vapor. Preferably, the plastic sheet portions have a water vapor transfer rate as low as 0.0010 or less (grams of water per twenty-four hours per 100 square inches at 100° F. at 100% relative humidity). Most preferably, this is accomplished by incorporating a metal foil coating illustrated at 46 in FIG. 5 on those portions that border the foam precursors 44 and 45. The water vapor transfer rates affect the shelf life of the bags 23. Thus, higher transfer rates are acceptable where shorter shelf life is acceptable, and materials with lower transfer rates can be incorporated where longer shelf life is desired or necessary.

In the illustrated embodiment, and in order to form the frangible seal, the plastic sheet portions further comprise an innermost layer formed of a heat sealable polymer resin for which the strength of the heat seal is a function of the heat sealing temperature applied to the resin. The preferred resins according to the present invention are ionomers; i.e. copolymers of ethylene and vinyl monomers with an acid group, such as methacrylic acid. As known to those familiar with polymer structures, ionomers are cross-linked with ionic linkages as well as covalent bonds. In particular, the SURLYN™ resins from Du Pont (e.g. SURLYN™ AD8273) provide the appropriate characteristics. The unique characteristics of these ionomers allow for the creation of frangible seals over a relatively wide range of temperatures (e.g. 180° F. –210° F.), and thus at desired varying strengths. As will be discussed herein, the temperatures required to form the frangible seals are generally much lower than those required to create the hermetic edge seals thereby enhancing the feasibility of creating both types of seals in one bag.

Thus, in one embodiment of the invention, the simplest way to make the frangible seals is to apply a sheet of the SURLYN™ ionomer as illustrated in FIG. 5, and then use a sealing die or similar heating device to heat the SURLYN™ layer to the desired temperature thereby forming the frangible seals of the desired strength.

It will be understood, however, that there are a number of other ways of making such frangible seals, for example zone patterning of thermoplastic materials or even an appropriate adhesive, and thus the SURLYN™ sheet of the illustrated embodiment is exemplary rather than limiting of the present invention.

FIG. 5 further illustrates that the plastic sheet portions include a layer of polyester 50 which provides strength and abrasive resistance to the overall plastic film material, and which has a sufficiently higher melting point (e.g. over 390° F.) than the SURLYN™ ionomer to permit the SURLYN™ layer 47 to be heat sealed at temperatures that do not affect the polyester layer 50.

The structure is completed by an overlying sheet of high density polyethylene (HDPE) 51. Polyethylene offers good mold definition, a high melting point (e.g. 275° F.), excellent resistance to many chemicals, high tensile strength and other desirable characteristics for the outermost layer of plastic.

It will be understood, that each of the layers, particularly the ionomer 47, the polyester 50 and the polyethylene 51, can be formed of a blend of such resins rather than a single resin, or as multiple layers of similar materials that are included for various purposes. Such variations are well understood to those of ordinary skill in the polymer arts, however, and will not otherwise be discussed in detail herein.

It will be further understood that polyethylene and polyester are preferred exemplary polymers for the various layers, and that the invention, or any particular layer, is not limited to these polymers, but can be formed of other polymers suitable for the same purpose and which can be selected by those of ordinary skill in these arts without undue experimentation.

Accordingly, in its preferred embodiment, the bag has an innermost layer 47 formed of the heat sealable polymer resin, a layer of metal foil 46 on the outer surface of the heat sealable layer, a polyester layer 50 on the outer surface of the metal foil layer, and an outermost layer 51 of polyethylene.

As discussed elsewhere herein and as generally known in these arts, the most common and useful type of foams are often formed from polyurethanes, so that one of the foam precursors will usually be a polyisocyanate, (often a diisocyanate) and the other foam precursor will be a hydroxyl containing composition such as propylene glycol. The precursors typically contain other materials such as water, catalysts and surfactants to produce foam of the desired characteristics. In particular, and as known to those familiar with the manufacture of such foams, if the foam forms too slowly, the cells formed by the generated gases will remain closed (rather than open) and will tend to collapse in use, thus reducing the usefulness of the resulting cushion.

Alternatively, if the foam expands too rapidly, the cell structure is said to be very "coarse," and tends to be structurally weaker than generally desired for packaging purposes. Accordingly, and as is generally well known in these arts (and as can be tailored without undue experimentation), the amount of surfactant and water included are adjusted to give the appropriate foam characteristics at the temperature at which the chemicals are mixed.

In this regard, because the present invention is an off-the-shelf system in which the foam precursors are used at ambient temperatures rather than being heated (typical foam-in-place precursors are heated to between 135° and 155° F. prior to mixing), it has been found useful to increase the amount of surfactant, particularly silicone surfactant, in the composition to obtain the proper foam characteristics at most expected end-use temperatures; e.g. 60°–100° F. Also, the amount of water incorporated can be controlled, usually for economic purposes. For example, a foam that produces a density of about 0.3 pounds per cubic foot at 140° F. will produce a denser (and thus more expensive) foam of about 0.45 pounds per cubic feet at room temperature. Adding more water to the precursor formulation will, however, generally lower the foam density at the lowered temperatures in a manner generally well understood in this art.

FIG. 5 also illustrates that the venting means comprises a small opening 52 in one of the edge seals that is surrounded by a pattern of partial seals generally designated at 53 on the interior of the bag 23 that permit gases to pass while blocking liquids and foams. In preferred embodiments, the bag 23 has one of the openings 52 in each of the corners of the bag opposite and furthest from the cells 42 and 43.

In a second embodiment, the bag 23 can be formed of first and second bags, with the second bag within the first bag. The first bag is formed of the two sheets 51 of the first plastic film material (preferably polyethylene as just set forth), sealed—or closed in some other manner as noted earlier—on all four sides by four respective edge seals. The remaining layers form a second bag within the first bag so that the second bag is formed of two sheets of a second plastic film material (preferably the layered combination of materials just described) sealed on all four sides. In the illustrated embodiment, three of the four sealed edges of the second bag are aligned and substantially coincident with three of the four sealed edges of the first bag. The fourth sealed edge of the second bag is a frangible seal and a fifth seal in the second bag divides a second bag into the two cells that contain the two foam precursors.

It will be understood, however, that in alternative embodiments one, two, or perhaps none of the closed edges of the second bag may be coincident with the edges of the first bag, depending on the desired position of the second bag within the first. Accordingly, any sealed edges of the second bag that are not coincident with an edge of the first bag are formed of frangible seals so that when the frangible seals of the second bag are broken, the first and second bags form a single cell.

In both embodiments, either the second bag, or the cells defined in a single bag, is proportionally smaller than the first bag based on the amount of foam precursors present and the expected volume of foam that the precursors will form.

Thus, the second embodiment is perhaps best understood with respect to FIG. 3 in which the four edge seals of the first bag are illustrated in FIGS. 2 and 3 at 33, 34, and 35. The three coincident seals of the second bag will align with seals 34, 35 and 36, the fourth sealed edge of the second bag is illustrated by the frangible seal 37 in FIG. 3, and the fifth and frangible seal in the second bag is illustrated by the frangible seal 40 in FIG. 3.

In a third embodiment, the bag 23 can be formed of adjacent first and second bags joined to one another along a frangible seal. Another frangible seal divides the second bag into the two cells that hold the foam precursors in the manner already described. When the respective frangible sealed are broken, the first and second bags form the single interior cell in which the foam precursors react and expand as described earlier. In this third embodiment, the bag 23 would in all other respects have the same general appearance as illustrated in, for example, FIGS. 2 and 3.

The foam-in-place packaging system of the present invention further comprises means for rupturing the frangible seals and mixing the precursors. The mixing and rupturing means is broadly designated at 30 in FIG. 1, and its structure and operation are best illustrated in FIGS. 6 through 9.

Figure 6:
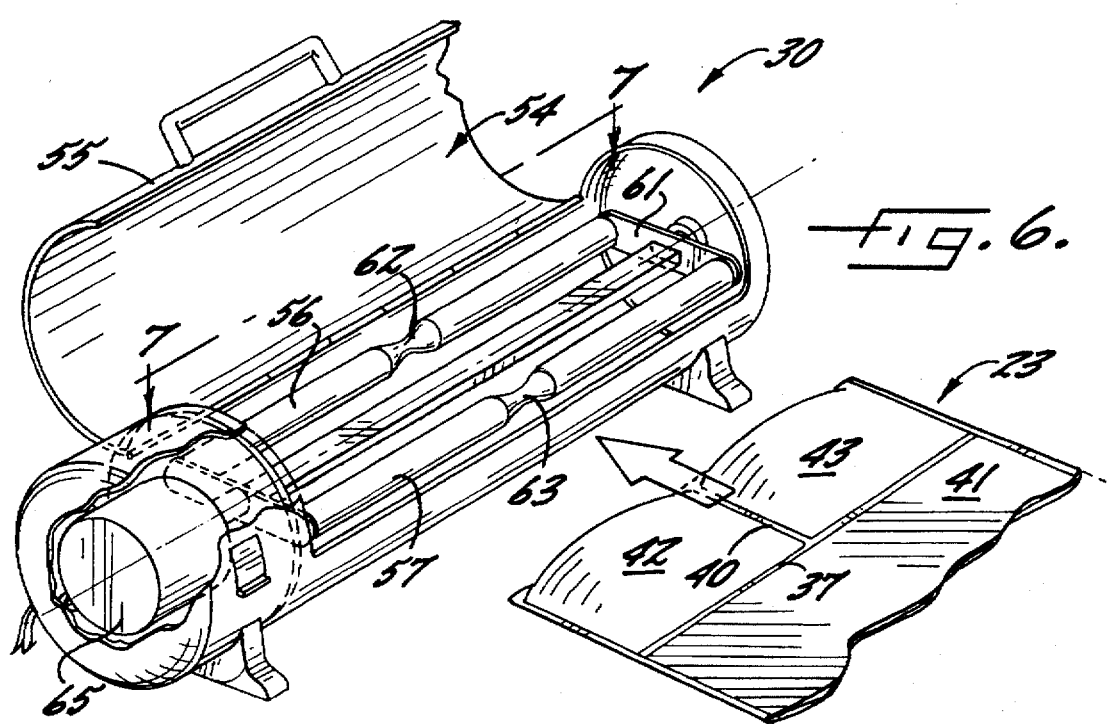
FIG. 6 is a perspective view of the device for rupturing the frangible seals in the bag and mixing the foam precursors according to the present invention.

FIG. 6 illustrates that the mixing means 30 includes the generally cylindrical chamber broadly designated at 54 and a clamping lid shown at 55. The chamber 54 is of a size to receive the precursor containing cells 42 and 43 of the bag 23. The clamping lid 55 initially clamps the cells 42 and 43 and the frangible seals 37 and 40 in the chamber apart from the majority of remaining cell 41 of the bag 23.

Means, shown as the rollers 56 and 57 in the chamber 54, rupture the frangible seals 37 and 40 and thoroughly mix the foam precursors 44 and 45 while the cells 42 and 43 are clamped in the chamber 54. As perhaps best illustrated in FIG. 8, the rollers 56 and 57 rotate on their own respective axes while their respective axes orbit about the axis of the cylindrical chamber. This rotary and orbital motion of the rollers 56 and 57 creates an aggressive peristaltic agitation that thoroughly mixes and combines the foam precursors. The rollers create a consistent foam of the proper precursor ratio independent of any direct external contact with the foam chemicals or any application of heat.

Figure 8:
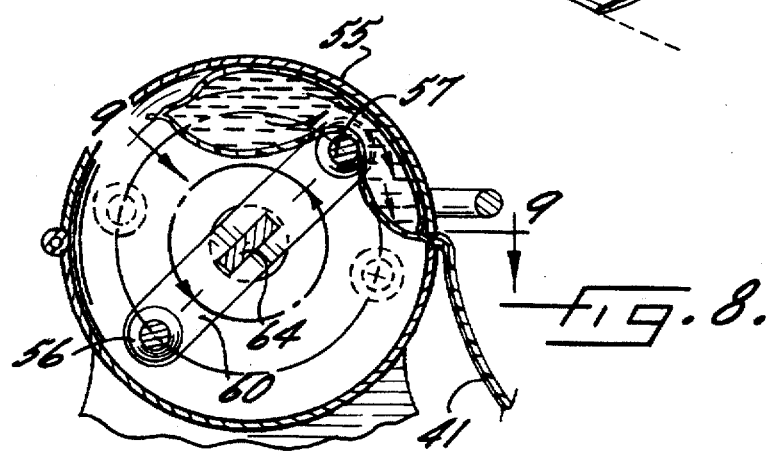
FIG. 8 is a cross-sectional view taken along lines 8—8 of FIG. 1.
Figure 7:
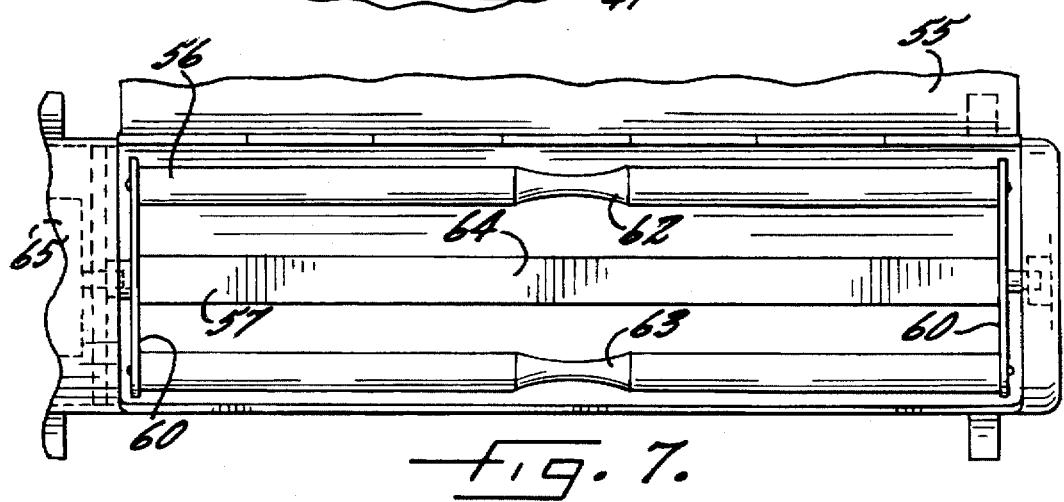
FIG. 7 is a top plan view taken along lines 7—7 of FIG. 6.

As FIG. 8 further illustrates, the rollers 56 and 57 are arranged on end plates 60 and 61. Each of the rollers includes at least one axial portion illustrated at 62 and 63 respectively that is narrower than the remaining axial portions to thereby define a space at which the foam precursors 44 and 45 will initially mix under the pressure applied by the rollers 56 and 57, but without rupturing the edge seals or plastic film of the bag. These narrower axial portions or "grooves" 62 and 63 provide a constant escape path for the converging chemicals. It will be understood that although FIG. 6 illustrates the narrower portions 62 and 63 centrally along the rollers 56 and 57, they can also be located in different positions to complement the structure of the bag and the positions of the frangible seals.

The mixing means 30 also includes a horizontal bar 64 (FIG. 7) which also rotates freely on a common axis with the axis of the cylindrical chamber 54 and which generally makes it somewhat easier to load a bag 23 into the mixer 30.

Figure 9:
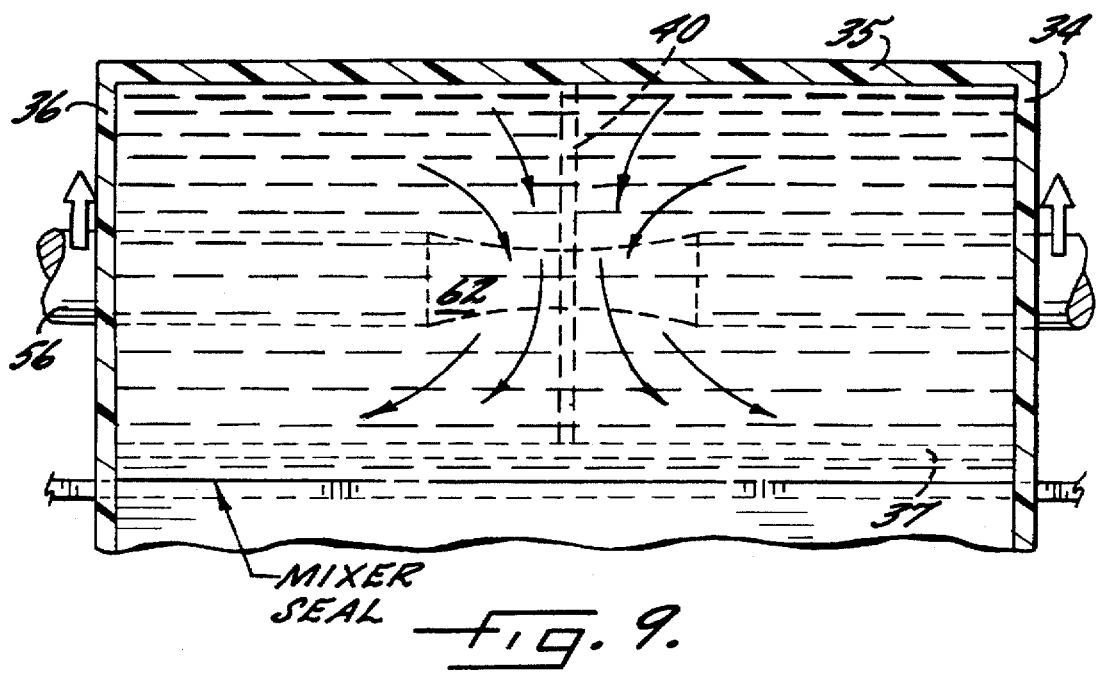
FIG. 9 is a cross-sectional view taken along lines 9—9 of FIG. 8.
Figure 10:
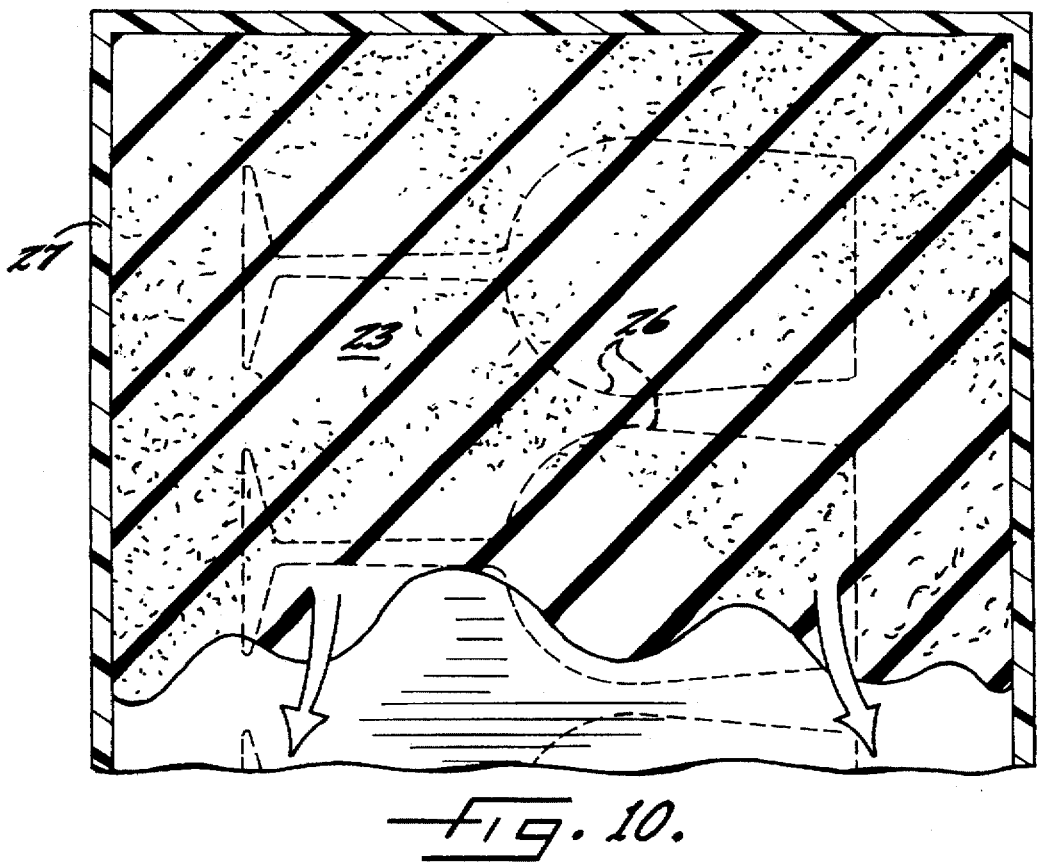
FIG. 10 is a cross-sectional view of a package with objects to be protected therein that incorporates a foam-in-place bag according to the present invention.

In operation, the mixer 30 provides a relatively short (3–5 second) mixing cycle which includes the steps of breaking the frangible seals, premixing the precursors, more fully mixing the precursors, and returning to a home position. More particularly, when the mixing cycle begins, the mixing rollers 56 and 57 rotate to position the header bag against the mixing chamber. The rollers continue to rotate to compress the precursors 44 and 45 inside the two cells 42 and 43 against the center frangible seal 40 (FIG. 9). The increased pressure ruptures the center frangible seal, after which the force of the rotating rollers continues to direct the precursors against the frangible seal 37 between the precursor containing cells 42 and 43 and the remaining cell 41 of the bag 23, causing the frangible seal 37 to zipper open. In preferred embodiments to date, this process takes approximately 0.3 seconds. As noted earlier herein, the presence of an inert gas in one or both of the cells can provide an additional (and tailored) amount of volume during the seal-breaking and precursor-mixing steps.

After the frangible seals 37 and 40 are broken, and in order to fully mix the chemicals, the rollers 56 and 57 are then driven at relatively high speed (about 200–300 rpm) to aggressively mix and blend the precursors. The constant pattern of pressurization and depressurization causes a turbulent flow of precursors that increases the mixing effectiveness. This portion of the process takes approximately two seconds.

After the mixing cycle is complete, the rollers 56 and 57 slowly rotate back to a home position through the use of a proximity switch. This home position process takes about one rotation at 30 rpm.

Although not all details are illustrated, in preferred embodiments the inner surface of the cylindrical mixing chamber 54 preferably contains a rubber pad against which the rollers compress the cells 42 and 43 to maximize chemical extrusion. The rubber pad can contain grooves complementing the grooves 62 and 63 in the rollers 56 and 57 to provide a flow channel for the chemicals during mixing.

The clamping lid 55 retains the bag with its cell section in the mixer 30 to securely hold the bag 23 in proper position during chemical mixing. The clamping lid 55 also provides a barrier that ensures proper pressurization during the frangible seal breaking cycle.

In preferred embodiments the rollers are driven by a motor 65 (FIG. 6) which can be a low cost direct current (dc) motor. Preferable torque requirements are 900 ounces-inch at 0 rpm and 80 ounce-inch at 300 rpm. The motor output can be adjusted or alleviated with gear reduction, timing belts, and pulleys in a manner quite familiar to those of ordinary skill in this art. In a preferred embodiment, the motor actuator is fully enclosed within the mixing machine and tamper proof so that if the clamping lid 55 is opened during the mixing cycle, the motor is immediately disengaged.

The present invention provides all of the benefits of traditional foam-in-place packaging, and the bags can be provided in a variety of sizes and foam densities. The invention is simple to use, requires minimal user training, and its cost is generally limited to the cost of the mixing machine and the number of bags desired. The invention is compact and requires minimal work and storage space, with an appropriate mixer being as small as ten inches by twenty inches by six inches.

The bags of the present invention virtually eliminate chemical exposure and eliminate the need for chemical drums, pumps, cleaning solvents, and cleaning devices. Similarly, the service and maintenance requirements are minimal, and the system is entirely portable.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed:

1. A foam in place packaging system comprising:
    a bag formed of two sheets of flexible plastic film material closed on all four side edges;
    a frangible seal that defines separate interior cells in said bag, to thereby define a single cell bag when said frangible seal is broken;
    a first foam precursor composition in one of said interior cells;
    a second foam precursor composition in another of said interior cells; and
    means for permitting gases to vent from said bag as the foam precursor form foam, while preventing foam or foam precursors from escaping;
    whereby when said frangible seal is entirely broken said separate cells thereby form a single interior cell in which said first and second foam precursors can mix thoroughly and react entirely to eliminate precursor residue and permit the resulting foam to expand properly and flow freely within the resulting single interior cell of said bag.

2. A foam in place packaging system according to claim 1 wherein at least one of said closed edges comprises a folded edge.

3. A foam in place packaging system according to claim 1 wherein at least one of said closed edges comprises a sealed edge.

4. A foam in place packaging system according to claim 1 comprising a plurality of said frangible seals between said two sheets that define three separate interior cells in said bag.

5. A foam in place packaging system according to claim 4 wherein at least one of said frangible seals extends between two of said edge seals.

6. A foam in place packaging system according to claim 1 wherein at least one of said frangible seals extends between one of said edge seals and another frangible seal.

7. A foam in place packaging system according to claim 4 wherein at least one of said frangible seals extends between two of said frangible seals.

8. A foam in place packaging system according to claim 1 wherein at least one of said cells also contains a gas that is chemically inert to said precursor composition, to thereby provide additional interior volume to break said frangible seals when exterior pressure is applied to said bag.

9. A foam in place packaging system according to claim 1 wherein the portions of said plastic sheets that form said cells with said first and second foam precursors therein are substantially impermeable to water vapor.

10. A foam in place packaging system according to claim 9 wherein said plastic sheet portions are coated with metal.

11. A foam in place packaging system according to claim 1 wherein said plastic sheet portions comprise a layer formed of a heat-sealable polymer resin for which the strength of the heat seal is a function of the heat sealing temperature applied to the resin.

12. A foam in place packaging system according to claim 11 wherein said heat-sealable layer forms said frangible seals.

13. A foam in place packaging system according to claim 1 wherein said plastic sheet portions comprise at least one layer of polyester.

14. A foam in place packaging system according to claim 1 wherein said plastic sheet portions comprise at least one outermost layer of polyethylene.

15. A foam in place packaging system according to claim 1 wherein said cells holding said foam precursors are each substantially filled with said foam precursors.

16. A foam in place packaging system according to claim 1 wherein said plastic film material comprises:
- an innermost layer formed of a heat-sealable polymer resin for which the strength of the heat seal is a function of the heat sealing temperature applied to the resin;
- a layer of metal on the outer surface of said heat-sealable layer;
- a polyester layer on the outer surface of said metal layer, and having a melting point higher than the heat-sealing temperature of said heat sealable resin; and
- an outermost layer of polyethylene on the outer surface of said polyester layer.

17. A foam in place packaging system according to claim 1 wherein said first foam precursor comprises a polyisocyanate and said second foam precursor comprises a hydroxyl-containing composition.

18. A foam in place packaging system according to claim 1 wherein said venting means comprises a small opening in one of said edge seals and surrounded by a pattern of partial seals on the interior of said bag that permit gases to pass while blocking liquids and foam.

19. A foam in place packaging system according to claim 18 wherein said opening is in one of the corners of said bag.

20. A foam in place packaging system according to claim 1 and further comprising means for rupturing said frangible seals and mixing the precursors.

21. A foam in place packaging system according to claim 20 wherein said rupturing means comprises:
- a chamber for receiving said precursor-containing cells of said bag;
- a clamp for clamping the precursor-containing cells in said chamber apart from the remainder of said bag; and
- means in said chamber for rupturing said frangible seals and mixing said foam precursors while said cells are clamped in said chamber to thereby encourage said precursors to mix thoroughly.

22. A foam in place packaging system according to claim 21 wherein said chamber is a cylinder and said mixing means comprises a plurality of rollers that rotate on their respective axes while their respective axes orbit about the axis of said cylindrical chamber.

23. A foam in place packaging system according to claim 22 wherein said rollers include at least one axial portion that is narrower than their remaining axial portions to thereby define a space at which said foam precursors will initially mix and will mix without rupturing the remainder of said bag.

24. A foam in place packaging system comprising:
- a first bag formed of two sheets of a first flexible plastic film material closed on all four side edges;
- a second bag within said first bag, said second bag being formed of two sheets of a second plastic film material closed on all four side edges, with those edges of said second bag that are not coincident with one of said edges of said first bag being frangibly sealed edges;
- at least one frangible seal that divides said second bag into two cells;
- a first foam precursor in one of said cells;
- a second foam precursor in the other of said cells; and
- means for permitting gases to vent from said first bag as said foam precursors form foam, while preventing foam or foam precursors from escaping from said first bag;
- whereby when said frangible seals are entirely broken said first and second bags thereby form a single interior cell in which said first and second foam precursors can mix thoroughly and react entirely to eliminate precursor residue and permit the resulting foam to expand properly and flow freely within the resulting single interior cell of said bag.

25. A foam in place packaging system according to claim 24 wherein at least one of said closed edges of said first bag comprises a folded edge.

26. A foam in place packaging system according to claim 24 wherein at least one of said closed edges of said first bag comprises a sealed edge.

27. A foam in place packaging system according to claim 24 wherein at least one of said closed edges of said second bag comprises a folded edge coincident with a closed edge of said first bag.

28. A foam in place packaging system according to claim 24 wherein at least one of said closed edges of said second bag comprises a sealed edge coincident with a closed edge of said first bag.

29. A foam in place packaging system according to claim 24 wherein three of said closed edges of said second bag are aligned and substantially coincident with three of said four edges of said first bag.

30. A foam in place packaging system according to claim 24 wherein said second bag is proportionally smaller than said first bag based upon the amount of foam precursors in said second bag and the volume of foam that said precursors will form.

31. A foam in place packaging system according to claim 24 wherein the portions of said second plastic film material that form said cells for said first and second foam precursors are substantially impermeable to water vapor.

32. A foam in place packaging system according to claim 31 wherein said second film material is coated with metal.

33. A foam in place packaging system according to claim 24 wherein said second plastic film material comprises a layer formed of a heat-sealable polymer resin for which the strength of the heat seal is a function of the heat sealing temperature applied to the resin.

34. A foam in place packaging system according to claim 33 wherein said heat-sealable layer forms said frangible seals.

35. A foam in place packaging system according to claim 24 wherein said second plastic film material comprises at least one layer of polyester.

36. A foam in place packaging system according to claim 24 wherein said first plastic film material comprises at least one layer of polyethylene.

37. A foam in place packaging system according to claim 24 wherein said cells holding said foam precursors are each substantially filled with said foam precursors.

38. A foam in place packaging system according to claim 24 wherein said second plastic film material comprises:
- an innermost layer formed of a heat-sealable polymer resin for which the strength of the heat seal is a function of the heat sealing temperature applied to the resin;
- a layer of metal on the outer surface of said heat-sealable layer; and
- a polyester layer on the outer surface of said metal layer, and having a melting point higher than the heat-sealing temperature of said heat sealable resin.

39. A foam in place packaging system according to claim 24 wherein said first foam precursor comprises a polyisocyanate and said second foam precursor comprises a hydroxyl-containing composition.

40. A foam in place packaging system according to claim 24 wherein said venting means comprises a small opening in one of said edges of said first bag and surrounded by a pattern of partial seals on the interior of said bag that permit gases to pass while blocking liquids and foam.

41. A foam in place packaging system according to claim 40 wherein said opening is in one of the corners of said first bag.

42. A foam in place packaging system comprising:

a first bag formed of two sheets of a first flexible plastic film material closed on all four side edges;

a second bag adjacent said first bag, said second bag being formed of two sheets of a second plastic film material closed on all four side edges, one edge of said second bag being joined to one edge of said first bag;

a frangible seal between said first and second bags;

at least one frangible seal that divides said second bag into two cells;

a first foam precursor in one of said cells;

a second foam precursor in the other of said cells; and means for permitting gases to vent from said first bag as said foam precursors form foam, while preventing foam or foam precursors from escaping from said first bag;

whereby when said frangible seals are entirely broken said first and second bags thereby form a single interior cell in which said first and second foam precursors can mix thoroughly and react entirely to eliminate precursor residue and permit the resulting foam to expand properly and flow freely within the resulting single interior cell of said bag.

43. A foam in place packaging system according to claim 42 wherein at least one of said cells also contains a gas that is chemically inert to said precursor composition, to thereby provide additional interior volume to break said frangible seals when exterior pressure is applied to said bag.

44. A foam in place packaging system according to claim 43 wherein the portions of said plastic sheets that form said cells with said first and second foam precursors therein are substantially impermeable to water vapor.

45. A foam in place packaging system according to claim 44 wherein said plastic sheet portions are coated with metal.

46. A foam in place packaging system according to claim 42 wherein said plastic sheet portions comprise a layer formed of a heat-sealable polymer resin for which the strength of the heat seal is a function of the heat sealing temperature applied to the resin.

47. A foam in place packaging system according to claim 42 wherein said plastic sheet portions comprise at least one layer of polyester.

48. A foam in place packaging system according to claim 42 wherein said plastic sheet portions comprise at least one outermost layer of polyethylene.

49. A foam in place packaging system according to claim 42 wherein said cells holding said foam precursors are each substantially filled with said foam precursors.

50. A foam in place packaging system according to claim 42 wherein said first foam precursor comprises a polyisocyanate and said second foam precursor comprises a hydroxyl-containing composition.

51. A foam in place packaging system according to claim 42 wherein said venting means comprises a small opening in one of said edge seals and surrounded by a pattern of partial seals on the interior of said bag that permit gases to pass while blocking liquids and foam.

52. A foam in place packaging system according to claim 51 wherein said opening is in one of the corners of said bag.

* * * * *